Dec. 19, 1961  A. E. GRIHANGNE ET AL  3,013,747
HELICOPTER LANDING SYSTEM

Filed May 25, 1960  4 Sheets-Sheet 1

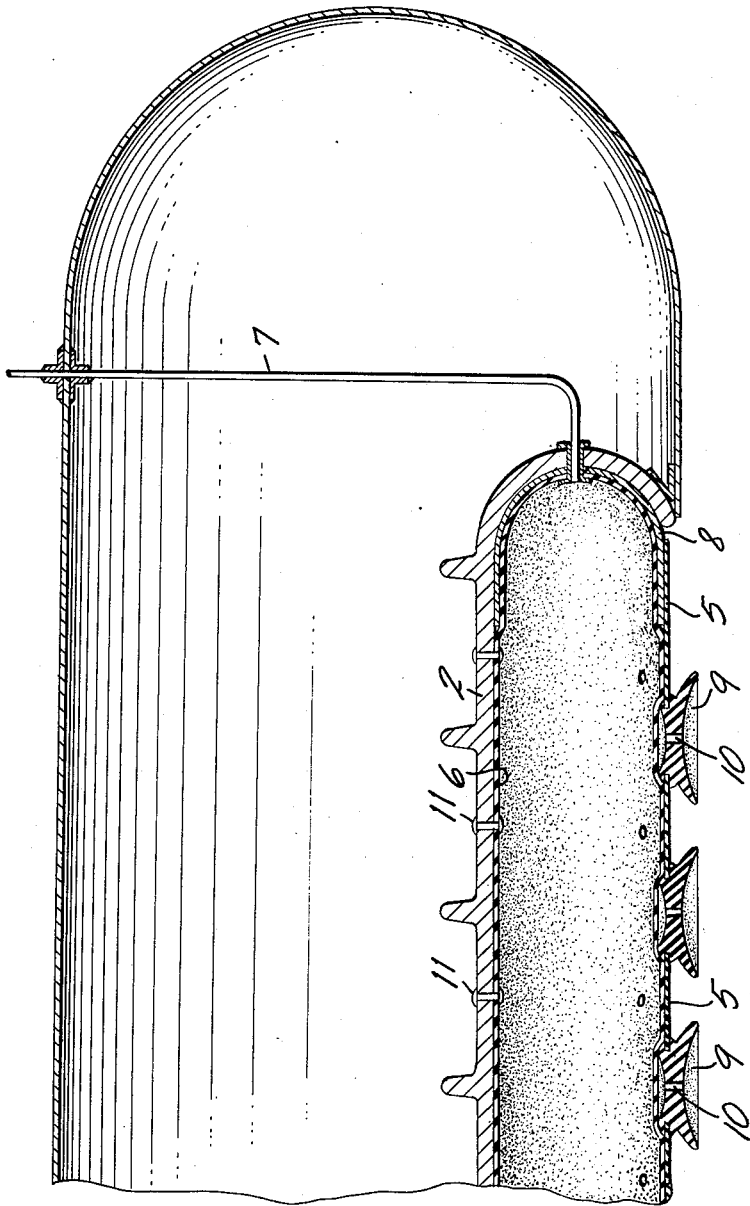

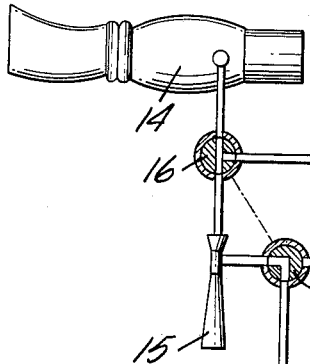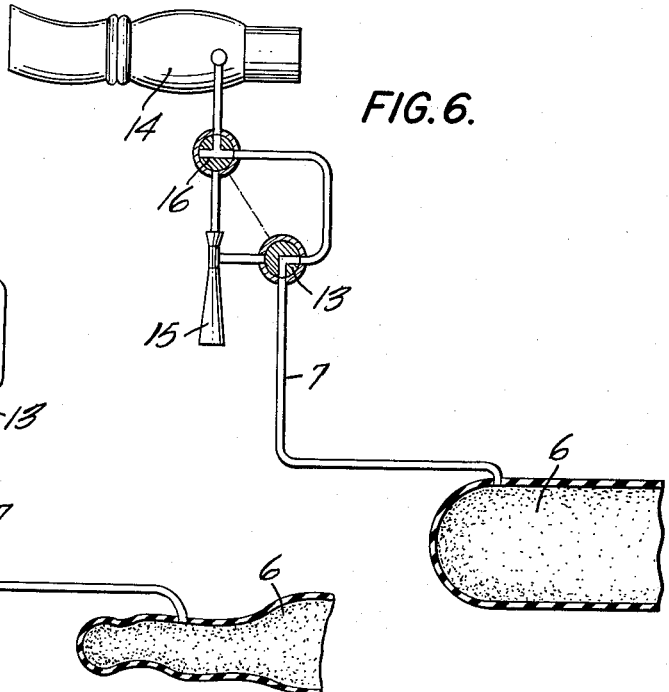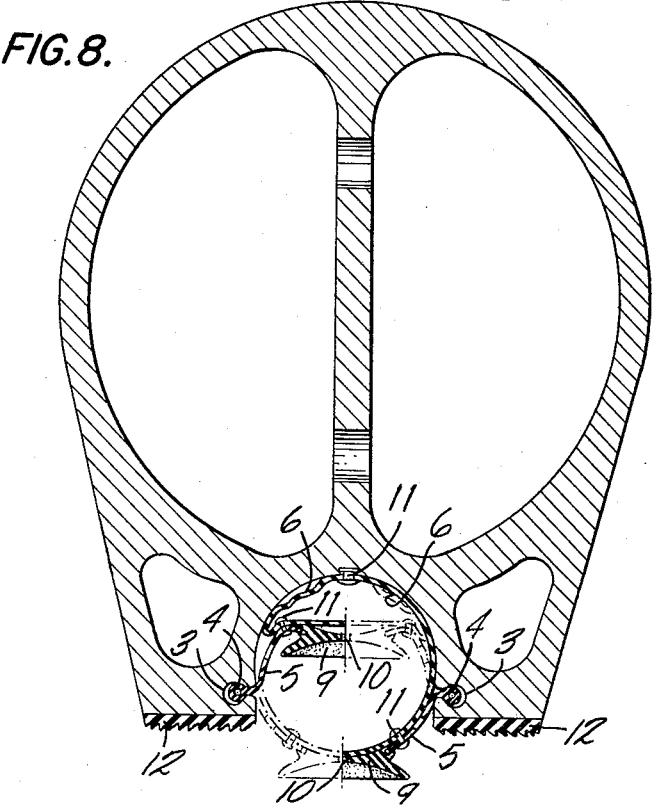

United States Patent Office 3,013,747
Patented Dec. 19, 1961

3,013,747
HELICOPTER LANDING SYSTEM
André E. Grihangne and Alain Fatou, Paris, France
Filed May 25, 1960, Ser. No. 31,604
Claims priority, application France May 30, 1959
6 Claims. (Cl. 244—17.17)

This invention relates to landing systems for helicopters, and more particularly for helicopters that are required to land and take off from movable platforms, such as the deck of a carrier ship.

Platforms or decks provided on shipboard for the landing and take off of helicopters at sea are exposed to the rolling and pitching motions of the ship. Relatively complicated means have been generally necessary heretofore for securing the helicopter to the platform prior to take-off and after landing to prevent such motions from endangering the helicopter. The fastening means have to be positioned and removed very rapidly when the need arises, and in a heavy sea such maneuvers are rendered difficult to carry out efficiently and expose the crewmen, to whom such operations are assigned, to very definite hazards.

It is an object of this invention to provide a landing and take off system for helicopters on shipboard which will be considerably more efficient, safe and dependable than systems in prior use. An object is to provide such a system which will completely eliminate the need for fastening means on the landing platform together with their attendant operating difficulties and hazards. Another object is to provide such a system that will be simple, inexpensive, rugged, fast-acting and versatile in its broad applicability to various types of conventional helicopters.

In developing the improved helicopter landing and take off system of the invention the applicants set out to fulfill the following chief requirements:

The means for fastening and releasing the helicopter to and from its landing system should be operable entirely and exclusively from within the helicopter itself (as contrasted from means operable from the platform).

Fastening of the helicopter on landing and release thereof at take-off should be operable so rapidly as to be practically instantaneous.

On take-off, and on repeated take-off, all of the fastening points of the helicopter to the platform should be released simultaneously.

The system should be completely dependable.

The change-over from the release or take-off condition to the fastening or landing condition and vice versa should be operable within an extremely short time and should be capable of repetition as many times as the pilot may deem it necessary and in quick succession.

Objects attained by the invention, therefore, are the provision of a system that will meet all of the above requirements.

The above and other objects are attained by the use of arrays of suction elements which are associated with a pair of landing members, such as floats or stabilizers, depending in transversely spaced relation from the bottom of the helicopter will be evenly distributed throughout conventional floats with which a marine or an amphibian helicopter is usually equipped, and may or may not be associated with retractible wheel landing gear. The landing members used in the invention may be the emergency floats or stabilizers that are sometimes provided, or they may be members especially constructed for the purposes of the invention. According to an important aspect of the invention, an elongated recess is provided in the bottom of each landing member, and an array of suction elements is supported from each member for retraction into and projection out of said recess, inflatable means being provided in said recesses for moving said suction elements between retracted and projected positions, and means aboard the helicopter for selectively inflating and deflating said inflatable means.

We are aware that the use of suction elements for helicopters has already been proposed as disclosed in U.S. Patent 2,101,399 to A. E. Larsen.

As will appear from the description furthermore, the large number of retractable suction elements used in the invention afford improved reliability should one or more of them fail to cling to the landing surface owing to some local roughness or dirt on such surface. The inflatable means used according to the invention for projecting the suction elements to their operative position simultaneously serve as load-transmitting means whereby the weight of the helicopter will be evenly distributed throughout the array of suction elements thus ensuring more reliable action of all said elements on landing.

The objects, features and advantages of the invention will be made apparent from the ensuing description given by way of indication but not of limitation with reference to the accompanying drawings, wherein:

FIG. 5 is a partial longitudinal sectional view drawn to the same scale as the view in FIG. 2, with the parts shown in projected position;

FIG. 6 is a schematic view of the pneumatic control system used according to an embodiment of the invention, in position for projecting the suction elements for landing;

FIG. 7 is a similar schematic view illustrating the parts in the positions assumed for retracting the suction elements for take-off; and FIG. 8 is a transverse cross sectional view of a modified embodiment of a landing member according to the invention, with the parts being shown in retracted position on the left side and in their projected position on the right side of the drawing.

Figure 4:
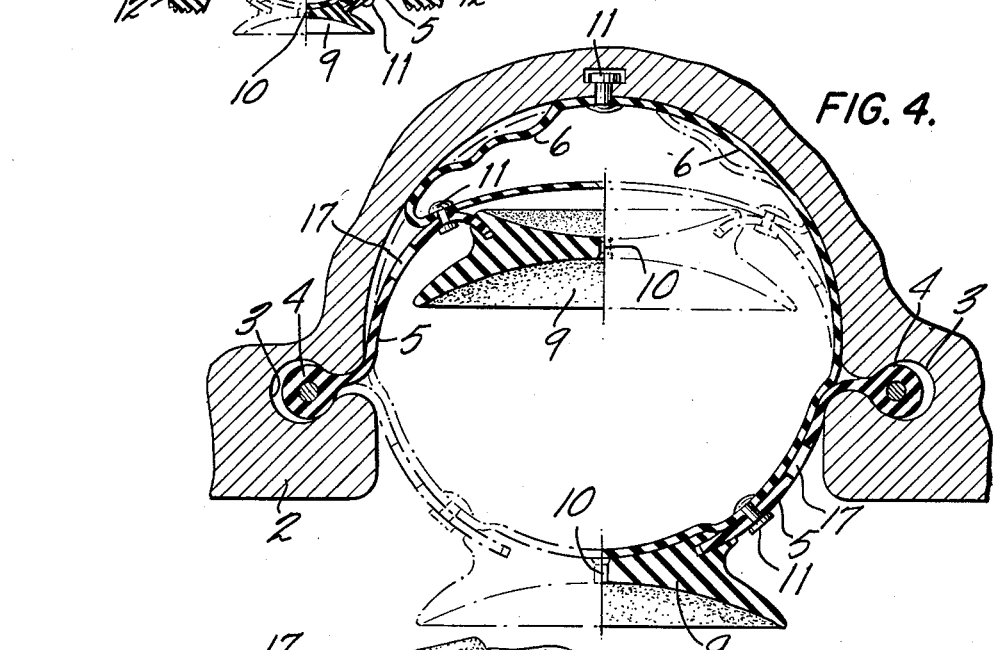
FIG. 4 is a larger scale view in cross section showing the rigid concave shell member with the attached elements including the suction cups, the parts being shown in retracted position in section on the left side portion of the drawing and illustrated in a projected position in section on the right side portion of the figure.
Figure 3:
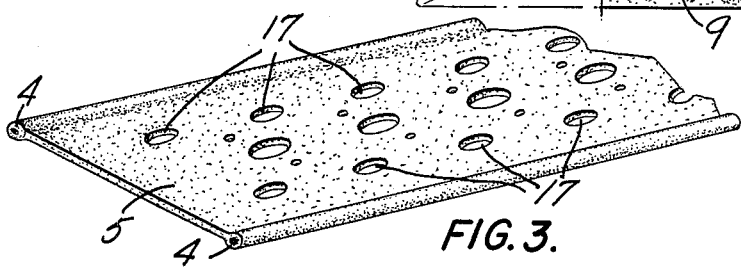
FIG. 3 is a perspective detail of the perforate flexible sheet or web element to which the suction cup elements of the invention are attached.

Referring first to FIGS. 1 to 7, there is illustrated an inflated float or landing member 1 of generally cylindrical shape with rounded or faired ends, and made from a suitable rubberized fabric or similar airtight sheet material. In a bottom side of the member 1 is inset a rigid semi-cylindrical shell member 2 extending longitudinally of the member 1 with its concavity turned outward. The open side of the concave member 2 is sealed by means of a rubberized fabric sheet or web element 5. This element 5 is perforated as at 17, and has two strong flexible wires extending along its opposite longitudinal sides to form reinforced side beads thereat, which are slidably insertable into a pair of opposed parallel grooves 3 formed in the opposite sides of the shell member 2. The sealing element 5 and concave shell 2 thus define a sealed cylindrical space along the lower side of the float, and in this space is inserted an inflatable tube or bladder 6 adapted for inflation and deflation independently of the float member 1 by way of a flexible hose 7. The inflatable tube 6 is generally cylindrical with substantially hemispherical end portions 8 which are made of reinforced flexible, inextensible material. The sealing web element 5 is adapted to receive an array of suction members 9 mounted therein along its outer, or lower side; one suitable form of the mounting means for a suction cup 9 is illustrated in FIG. 4. Further, a central orifice 10 is formed through each suction cup for connecting its opposite sides.

Figure 1:
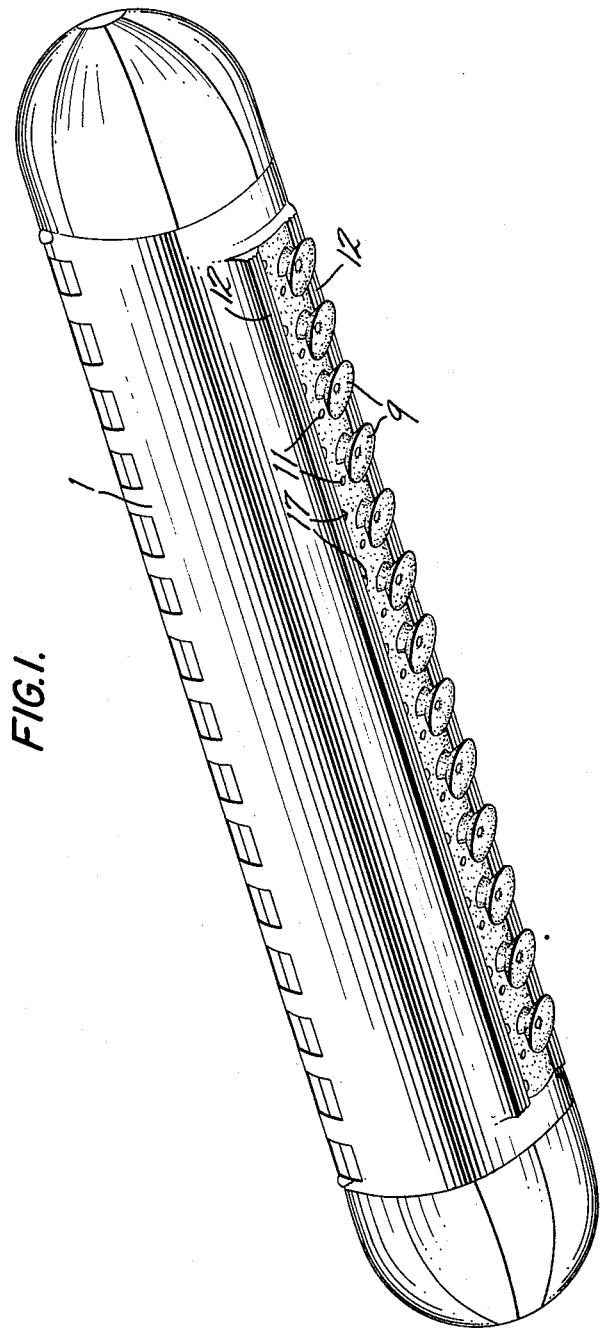
FIG. 1 is a perspective view of a landing member equipped with suction cups according to the invention in the landing condition.
Figure 2:
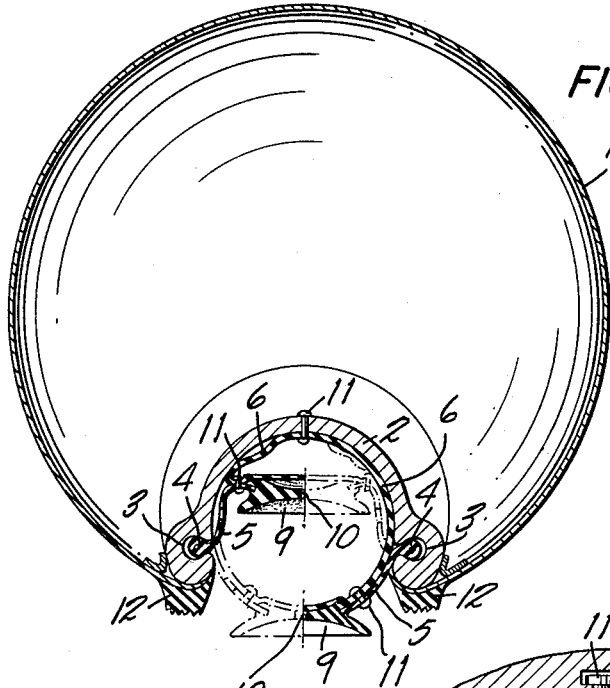
FIG. 2 is a cross section of a landing member showing on the left side in section the retracted condition and on the right side in section the projected condition of the suction elements and the related components including inflatable tube and flexible sheet or web element.

In FIGS. 2 and 4 the suction members 9 are illustrated in their two positions, in a retracted position illustrated in section in the left hand portion of the figures and the rest thereof is in phantom and are illustrated in an operative lowered position in section on the lower right hand part of the figures with the remaining part thereof in section.

The inflatable tube 6 may be secured to the shell member 2 and to the suction cup-carrying web element 5 in any suitable manner. Thus, in the illustrated example, rivet means 11 pre-attached to the tube 6 are used for fastening the tube 6 at a plurality of spaced points both to the inner wall surface of shell 2 as shown at the top center of FIG. 4, and to the web 5, as shown at the bottom right of the figure. The rivets 11 are secured to the tube 6 prior to assembly.

Attached along the spaced lower edge portions of the recess defined in each float assembly, adjacent the sides of the shell member 2, are disposed skids or shoes 12 made of a suitable wear-resisting material and provided with anti-skid outer surfaces for receiving the float assembly on the surface of the ground or other unprepared surface, e.g. in an emergency in the condition where the tube 6 is deflated to retract the sealing web 5 and the suction cups supported thereby in a manner to be further described.

Referring especially to FIGS. 6 and 7, it will be seen that a valve member 13 is provided for selectively and alternatively connecting the hose 7 with a source of air pressure and a source of suction. Specifically, these figures illustrate one embodiment of the control system for the float assembly especially applicable to a turbine-powered helicopter. The source of pressure air may then conveniently be derived from the turbine compressor 14. The source of suction is provided for example by the throat of a venturi nozzle 15 the inlet of which may be supplied from the pressure source 14 by way of a further valve 16 mechanically coupled for operation with valve 13. Thus in one position of two-way valve 13 hose 7 is connected with the pressure source 14 and the inlet of venturi nozzle 15 is disconnected from said pressure source, while in the other position of valve 13 hose 7 is connected with the throat of venturi 15 while the venturi inlet is connected with the pressure source 14 so as to apply suction to hose 7.

The operation of the system can be described as follows.

Before easing the helicopter down on the landing platform the pilot inflates the inner tube 6. The control valves are positioned as shown in FIG. 6. This applies to the inner tube 6 a suitable pressure of the order of say 3 atmospheres thereby firmly applying the walls of the tube against the upper ends of the vent orifices 10 of the suction cups, sealing said orifices. As the helicopter lands, the impact at landing flattens out the suction cups under the distributed load of the helicopter and instantly expels the air therefrom so that the helicopter immediately clings to the surface of the platform without "bouncing." The relatively large number of suction cups provided ensures that the desired clinging effect will be achieved even though some of the suction cups may not operate e.g. due to some local roughness or dirt on the platform surface.

For taking off, the pilot displaces the valves 13 and 16 to the position shown in FIG. 7. The tube 6 is now connected to a source of suction (at the throat of venturi 15) and rapidly deflated, and its walls collapse inward under the action of atmospheric pressure applied through the wide perforations 17 in the web 5. On collapse of the tube 6 all the suction cups are simultaneously vented to atmosphere as it retracts the cup-carrying web 5 inward due to the firm attachment of tube 6 with the rigid shell 2 and web 5 by means of the rivets 11. The helicopter is thus instantly released for take-off.

At any time during flight the pilot is able to inflate the tube 6 so as to set the suction cups to their "ready" position by shifting the valves 13 and 16 to the inflating position of FIG. 6.

The modified embodiment shown in FIG. 8 differs from that described only in the construction of the landing "float." While in the first embodiment described, and as apparent especially from FIG. 2, the float member 1 was an inflatable member made from flexible material, the corresponding member in FIG. 8 is a rigid or semi-rigid member of generally cellular construction, divided into two (as shown) or more compartments by one or more internal partitions.

It will be evident that any desired number of suction elements such as 9 may be provided in a system according to the invention. The number will in part depend on the shape and size of the landing member or float 1 from which they are supported. Thus, the greater the length and the smaller the width of such member, the more suction elements should preferably be provided, the diameter of each element being correspondingly reduced. As an order of magnitude, the number of suction elements used may conveniently be twenty, though substantially more or less may be used within the scope of the invention.

It will be understood that the member herein sometimes referred to as a float, is one of two similar members provided beneath the helicopter in longitudinally extending, transversely-spaced positions. They may comprise the normal float members conventionally provided on marine and amphibian helicopters, or similar floats as are sometimes provided as safety landing gear on some types of helicopters having retractible wheel landing gear. The said members may be in the nature of stabilizing ballonets.

The action of the skates or shoes 12 is to protect the lower surfaces of such float members against possible damage by impact at landing.

The landing system for helicopters herein described has a number of advantages. Owing to the large number of suction members provided, instantaneous adhesion of the craft to the landing platform surface is achieved. The float member and inflated inner tube ensure a uniform distribution of the load as between all of the suction elements. The pneumatic control system provided for activation and de-activation of the suction elements places the clinging and releasing actions under easy and instantaneous command by the pilot and thus enables him, inter alia, to choose the presice instant which is most favorable for take-off as the platform is rolling and pitching in a heavy sea. Conversely, the extremely short time required to set the suction elements to their ready condition makes it possible, if necessary, to put down the helicopter again on its landing platform immediately after a take-off. Due to the retractability of the suction elements into the concave rigid shell, a landing of the craft on an unprepared landing site in an emergency or for other causes will not damage the relatively delicate suction cups.

Furthermore, it will be noted that the construction described uses static parts exclusively, that is does not include any moving mechanical components such as valves, linkage, sliding members and the like, so that the entire system is rugged and dependable.

The improved helicopter landing gear or system simultaneously serves as an independent, quick-fastening or belaying means which makes it possible to simplify the construction of landing platforms and eliminate all or a large part of the apparatus heretofore provided thereon for the purpose of fastening the helicopters thereon. With the helicopters equipped with the novel landing system, no further fastening equipment will generally be required on the platform itself, beyond a simple retainer device which may become necessary under conditions of very sever rolling for preventing sideslip or skidding of the suction cups along the platform. Such a retainer device may comprise for example a simple pair of parallel strips on the platforms adapted automatically to move in around the outer longitudinal edges of the skates or shoes 12 immediately after a helicopter has landed to prevent such sideslipping.

The system described further provides a convenient means of lifting the helicopter for handling purposes. That is, with the inner tube deflated and the suction cups retracted a handling or hoisting platform can very easily be slipped under the helicopter for displacing or lifting it.

The entire system is inherently lightweight and the total weight of a helicopter landing gear provided with the improved system can be very considerably less than that of a wheel gear with emergency float means.

It will be understood that a variety of modifications in and departures from the structure illustrated and described may suggest themselves to those familiar with the art on becoming cognizant of the teaching of the invention without departing from the scope thereof.

What we claim is:

1. In a helicopter having at least a pair of transversely spaced, longitudinally elongated, depending landing members, a rigid, elongated, concave shell secured in the bottom of each member for defining a downwardly open recess therein, a flexible sheet member secured across the sides of each recess, an array of suction cup elements supported from the outer surface of each flexible member, inflatable means within each recess in the space between said shell and said flexible member, and means on the helicopter for selectively inflating and deflating both inflatable means for simultaneously projecting all said suction cup elements for landing and retracting said elements for take-off.

2. In a helicopter having at least a pair of spaced, generally cylindrical, float-like landing members depending therefrom, a rigid shell member secured in the bottom of each landing member for defining a downwardly open recess therein, a perforate flexible sheet member secured across the sides of each recess, an array of spaced suction cups secured to the outer surface of each sheet member, an inflatable tube within each recess positioned between and secured to the walls of said shell and said sheet member, and operator-operable means for selectively inflating and deflating said inflatable means.

3. In the combination claimed in claim 2, a pair of parallel longitudinal grooves formed in each said shell member along the sides thereof, and enlarged reinforced side beads on the opposite sides of each flexible member receivable in said grooves for longitudinal sliding insertion of the sheet members into the shell members.

4. In a helicopter having at least a pair of transversely spaced, longitudinally elongated, depending landing members, for each landing member a rigid, elongated, concave shell secured in the bottom of a corresponding member for defining a downwardly open recess therein, for each recess a flexible sheet member secured across the recess and having spaced perforations thereon, an array of suction cup elements supported from the outer surface of each said flexible sheet members, for each recess inflatable means within each recess in a space between said shell and said flexible members, and means on the helicopter for selectively inflating and deflating both inflatable means for alternatively projecting all said suction cup elements for landing and retracting said elements for take-off, each cup element having a central opening in position to be closed by said inflatable means when inflated and an opened condition when said inflatable means is deflated.

5. In an aircraft capable of vertical ascent and descent having at least a pair of transversely spaced, longitudinally elongated, depending landing members, for each landing member rigid, elongated means secured in each landing member defining a downwardly open recess therein, for each landing member a flexible sheet member secured across its recess, an array of suction cup elements supported from the outer surface of each flexible member operable to releasably secure the landing members to a landing surface, means operable for automatically retracting said flexible sheet members into said recesses simultaneously thereby to retract said cup-elements into said recesses and means operable for automatically positioning said flexible sheet members in a substantially semi-rigid condition simultaneously transversely of said recesses with said cup elements positioned outwardly thereof thereby to position said cup members outwardly of said landing members in operative positions for releasably securing said landing members to a surface on which said aircraft is to land.

6. In an aircraft according to claim 5, in which means for automatically retracting said flexible sheet members and for automatically positioning said flexible sheet members transversely of said recesses comprises, for each recess inflatable means secured to said flexible sheet members and disposed in a space between said recess defining means and said sheet members, and means on the aircraft connected for selectively inflating and deflating said inflatable means simultaneously.

References Cited in the file of this patent

UNITED STATES PATENTS

| | | |
|---|---|---|
| 2,101,399 | Larsen | Dec. 7, 1937 |
| 2,494,445 | Moeller | Jan. 10, 1950 |
| 2,586,218 | Cazda | Feb. 19, 1952 |
| 2,702,171 | Katzenberger | Feb. 15, 1955 |
| 2,871,053 | Richter | Jan. 27, 1959 |